United States Patent
Wittenbecher et al.

(10) Patent No.: US 8,038,975 B2
(45) Date of Patent: Oct. 18, 2011

(54) PROCESS FOR PREPARING CRYSTALLINE HYDROXYLAMINE-O-SULFONIC ACID

(75) Inventors: Lars Wittenbecher, Mannheim (DE); Reinhold Goth, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 44 days.

(21) Appl. No.: 12/524,243

(22) PCT Filed: Jan. 21, 2008

(86) PCT No.: PCT/EP2008/050643
§ 371 (c)(1),
(2), (4) Date: Jul. 23, 2009

(87) PCT Pub. No.: WO2008/090124
PCT Pub. Date: Jul. 31, 2008

(65) Prior Publication Data
US 2010/0111807 A1    May 6, 2010

(30) Foreign Application Priority Data
Jan. 25, 2007  (EP) .................................... 07101193

(51) Int. Cl.
*C01B 21/093*    (2006.01)
(52) U.S. Cl. ........................................ 423/388
(58) Field of Classification Search .................. None
See application file for complete search history.

(56) References Cited

U.S. PATENT DOCUMENTS 3,281,209 A    10/1966  Wehrmeister et al.
4,737,354 A *  4/1988  Fuchs et al. .................. 423/388

FOREIGN PATENT DOCUMENTS

| DE | 1 667 513 A1 | 6/1971 |
| DE | 36 01 217 A1 | 7/1987 |
| DE | 43 25 438 A1 | 2/1995 |
| JP | 54 14900 A | 11/1979 |

OTHER PUBLICATIONS

Labch28 2003 http://web.cocc.edu/zziegler/o_chem/recitaitons/labch28.htm.*
International Preliminary Report on Patentability for international application PCT/EP2008/050643, mailed Sep. 3, 2009.

* cited by examiner

*Primary Examiner* — Melvin Mayes
*Assistant Examiner* — Stefanie Cohen
(74) *Attorney, Agent, or Firm* — Connolly Bove Lodge & Hutz LLP

(57) ABSTRACT

A process for preparing crystalline hydroxylamine-O-sulfonic acid by
a. reacting hydroxylamine or a hydroxylammonium salt with oleum/sulfuric acid or with chlorosulfonic acid/sulfuric acid at a temperature in the range from 90 to 130° C.,
b. continuing to stir the reaction mixture at a temperature in the range from 90 to 130° C. for a period of from 2 to 24 hours,
c. cooling the reaction mixture to a temperature in the range from 10 to 40° C. within a period of from 1 to 12 hours and
d. subsequently removing and washing the hydroxylamine-O-sulfonic acid which has crystallized out.

3 Claims, No Drawings

PROCESS FOR PREPARING CRYSTALLINE HYDROXYLAMINE-O-SULFONIC ACID

CROSS REFERENCE TO RELATED APPLICATIONS

This application is a national phase of PCT/EP2008/050643, filed on Jan. 21, 2008 which claims priority to EP 07101193.6 filed Jan. 25, 2007, the entire contents of all are hereby incorporated by reference.

DESCRIPTION

The present invention relates to a process for preparing crystalline hydroxylamine-O-suffonic acid.

Hydroxylamine-O-sulfonic acid is a frequently used reagent for preparing nitriles from aldehydes and hydrazines from amines.

It is known that hydroxylamine-O-sulfonic acid can be prepared by reacting solid hydroxylammonium sulfate or chloride with chlorosulfonic acid or oleum. Examples thereof can be found, inter alia, in DE 36 01 217 A1, DE 43 25 438 A1 and in DE 16 67 513.

DE 43 25 438 A1 describes the preparation of hydroxylamine-O-sulfonic acid from solid hydroxylammonium sulfate, sulfuric acid and 65% oleum or chlorosulfonic acid at 85° C. By adding glacial acetic acid and di-n-butyl ether, hydroxylamine-O-sulfonic acid is crystallized out of the reaction mixture, then filtered, washed with petroleum ether and dried at 50° C. under reduced pressure.

DE 36 01 217 A1 describes the preparation of hydroxylamine-O-sulfonic acid from hydroxylammonium sulfate and oleum at elevated temperature (110° C.), and also the removal of hydroxylamine-O-sulfonic acid from the sulfuric acid and the workup of the sulfuric acid which still comprises hydroxylamine-O-sulfonic acid.

DE 16 67 513 describes the hydroxylamine-O-sulfonic acid synthesis from hydroxyammonium sulfate, oleum or chlorosulfonic acid between 0° C. and 80° C. in inert organic solvents (for example carbon tetrachloride, methylene chloride, trichlorobenzene), in which hydroxylamine-O-sulfonic acid is insoluble and from which hydroxylamine-O-sulfonic acid can be removed easily, After the removal, hydroxylamine-O-sulfonic acid is washed once again with the organic solvents and dried.

U.S. Pat. No. 3,281,209 describes a process for preparing hydroxylamine-O-sulfonic acid by first preparing hydroxylammonium sulfate from nitromethane and 100% sulfuric acid and then reacting it with $SO_3$ to give hydroxylamine-O-sulfonic acid. Hydroxylamine-O-sulfonic acid is crystallized out of the reaction mixture directly by adding ethyl acetate and cooling to from −10° C. to +20° C. and filtered off.

The crystals of hydroxylamine-O-sulfonic acid prepared by the abovementioned processes do not always meet the requirements made with regard to the desired purity and particle size. Frequently, it is observed that the resulting crystals are too fine and can therefore be filtered only at high cost and inconvenience.

It was therefore an object of the present invention to provide a process for preparing crystalline hydroxylamine-O-sulfonic acid with which a readily filterable, highly pure product is obtained in good yield.

This object was achieved by the provision of a process for preparing crystalline hydroxylamine-O-sulfonic acid by a. reacting hydroxylamine or a hydroxylammonium salt with oleum/sulfuric acid or with chlorosulfonic acid/sulfuric acid at a temperature in the range from 90 to 130° C., b. continuing to stir the reaction mixture at a temperature in the range from 90 to 130° C. for a period of from 2 to 24 hours, c. cooling the reaction mixture to a temperature in the range from 10 to 40° C. within a period of from 1 to 12 hours and d. subsequently removing and washing the hydroxylamine-O-sulfonic acid which has crystallized out.

The hydroxylammonium salts usable for the process may be salts of inorganic or else organic acids, for example the salts of hydroxylamine with sulfuric acid, hydrochloric acid or hydrobromic acid, phosphoric acid, nitric acid or acetic acid. Preference is given to using the readily available hydroxylammonium sulfate.

As a preferred reagent for preparing hydroxylamine-O-sulfonic acid in process step a., oleum in sulfuric acid is used. Preference is given to initially charging hydroxylamine or a hydroxylammonium salt in concentrated sulfuric acid and admixing it with oleum. However, it is also possible to initially charge concentrated sulfuric acid and oleum or chlorosulfonic acid and to admix them with hydroxylamine or a hydroxylammonium salt.

Oleum (also known as fuming sulfuric acid) is a solution of sulfur trioxide ($SO_3$) in sulfuric acid ($H_2SO_4$) with varying proportions of sulfur trioxide (e.g. 24% or 65% $SO_3$).

According to the invention, the reaction temperature is in the range from 90 to 130° C., preferably in the range from 100 to 120° C., more preferably in the range from 105 to 115° C.

To achieve the desired coarse crystals, the reaction mixture in process step b. is stirred at a temperature in the range from 90 to 130° C., preferably in the range from 100 to 120° C., more preferably in the range from 105 to 115° C., for a further period of from 2 to 24 hours, preferably from 4 to 12 hours, more preferably from 6 to 10 hours.

Subsequently, the reaction mixture is cooled to a temperature in the range from 10 to 40° C., preferably in the range from 15 to 35° C., more preferably in the range from 20 to 30° C. within a period of from 1 to 12 hours, preferably from 4 to 10 hours, more preferably from 6 to 9 hours.

The crystallized hydroxylamine-O-sulfonic acid is isolated from the reaction mixture in process step d. by known separating methods customary in chemical process technology, for example filtration or centrifugation.

To remove the sulfuric acid adhering to the crude product and hence to achieve the desired product purity, the filtercake has to be washed thoroughly. The prior art has disclosed washing solvents including acetic acid, which can also be used for this purpose in the present process according to the invention.

In a preferred embodiment of the process according to the invention, the hydroxylamine-O-sulfonic acid crystals are washed in step d. with acetic acid or a $C_1$-$C_8$-alkyl ester of an aromatic carboxylic acid.

In the case of use of acetic acid, there may, however, depending on the sulfuric acid content, be heating of the filtercake. Depending on the extent of this heating, a portion of the hydroxylamine-O-sulfonic acid can dissolve irreversibly in the glacial acetic acid and thus lead to yield losses. In order to avoid this problem and to increase the yields of hydroxylamine-O-sulfonic acid, it is advantageous to cool the filtration apparatus.

In a particularly preferred embodiment of the process according to the invention, therefore, the hydroxylamine-O-sulfonic acid crystals are washed in step d. with a $C_1$-$C_8$-alkyl ester of an aromatic carboxylic acid.

The $C_1$-$C_6$-alkyl ester of an aromatic carboxylic ester used as the wash solution is preferably a $C_1$-$C_6$-alkyl ester of benzoic acid.

Useful alkyl radicals include linear or branched $C_1$-$C_6$-alkyl chains, e.g. methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Preferred alkyl radicals are methyl, ethyl, n-propyl and 1-methylethyl, more preferably methyl and ethyl, most preferably methyl.

In a further particularly preferred embodiment of the process according to the invention, the washing of the crystals with one of the abovementioned benzoic esters, especially methyl benzoate, is followed by additional washing with ethyl acetate in order to displace the higher-boiling benzoic esters and hence to shorten the time for the subsequent drying.

In a likewise preferred embodiment of the process according to the invention for preparing crystalline hydroxylamine-O-sulfonic acid, a. hydroxylammonium sulfate is dissolved in sulfuric acid and oleum is metered in at a temperature in the range from 105 to 115° C. within a period of from 0.2 to 4 hours preferably 0.5 to 3 hours, more preferably 1 to 2 hours,
b. the reaction mixture, after the oleum addition has ended, is stirred at a temperature in the range of from 105 to 115° C. for a further period in the range from 6 to 10 hours,
c. the reaction mixture is subsequently cooled to a temperature in the range from 20 to 30° C. within a period of from 6 to 9 hours and
d. the hydroxylamine-O-sulfonic acid crystals formed are filtered off and washed with methyl benzoate and then with ethyl acetate.

The hydroxylamine-O-sulfonic acid crystals prepared by the process according to the invention feature a purity of >96%, preferably >98%, more preferably >99%. The mean particle size distribution of the crystals (volumetric mean diameter) is in the range from 50 to 110 μm and thus sets itself apart clearly from the significantly smaller particle sizes described in the prior art.

The process according to the invention will be illustrated in detail with reference to the examples which follow.

EXAMPLE 1

Preparation of Hydroxylamine-O-sulfonic Acid from 65% Oleum 872 g of 97% $H_2SO_4$ were initially charged and 266 g of solid hydroxylammonium sulfate were dissolved therein. The oleum metering to the resulting 23.4% hydroxylammonium sulfate/$H_2SO_4$ solution began at T=25° C. A total of 578 g of 65% oleum were metered in within 0.5 h, and the temperature was brought to T=110° C. by external heating at the end of the reaction. Subsequently, the reaction mixture was kept at this temperature for 6 h. The cooling to T=25° C. was effected within 8 h. After filtering-off the sulfuric acid, washing the filtercake with a total of 400 g of glacial acetic acid and 360 g of ethyl acetate, and drying the product under reduced pressure at T=50° C. for 12 h, 287 g of hydroxylamine-O-sulfonic acid were obtained in a yield of 78%. The purity was >98%. The filter resistance measured during the removal of the crystals was $a\eta=4*10^{13}$ mPas/m$^2$. The mean particle size distribution of the dried end products from two different batches was 91.4 μm and 106.4 μm respectively (volumetric mean diameter).

EXAMPLE 2

Preparation of Hydroxylamine-O-sulfonic Acid from 24% Oleum 239 g of 97% sulfuric acid and 133 g of 24% oleum were first used to obtain 372 g of 100% sulfuric acid, into which a total of 200 g of hydroxylammonium sulfate were suspended at RT. The mixture was heated to T=60° C. and, within 0.5 h, admixed with 813 g of 24% oleum, and temperature was brought to T=110° C. by external heating at the end of the reaction. Subsequently, the reaction mixture was kept at this temperature for 6 h. The cooling to T=25° C. was effected within 8 h. After filtering-off and washing the filtercake with a total of 300 g of glacial acetic acid and 270 g of ethyl acetate, after drying under reduced pressure at. T=50° C. for 12 h, a total of 222 g of hydroxylamine-O-sulfonic acid were obtained in a yield of 81% based on the hydroxylammonium sulfate used. The purity was >98%.

EXAMPLE 3

Preparation of Hydroxylamine-O-sulfonic Acid from 65% Oleum, Influence of the Speed of Cooling 1205 g of 100% $H_2SO_4$ were initially charged and 250 g of solid hydroxylammonium sulfate were dissolved therein. The oleum metering to the resulting 17.2% hydroxylammonium sulfate/$H_2SO_4$ solution began at T=25° C. During the oleum addition, the temperature was restricted to T=25° C. by cooling. The crystallization of HOSA began as early as in the course of the oleum addition. Some of the solid formed was taken from the reaction mixture and analyzed by light microscopy. The solid was microcrystalline and very greatly agglomerated.

The mixture was divided into three equal parts.

Attempts were made without success to filter the first part of the reaction mixture through a G3 glass suction filter without further treatment.

The second part of the batch was subsequently heated to $T_{max}=110°$ C. with stirring, stirred at this temperature for 1 h and cooled rapidly within 1 h. The rapid cooling led to a product which was not filterable through a G3 glass suction filter.

The third part was subsequently heated to $T_{max}=110°$ C. with stirring, stirred at this temperature for 1 h and cooled to T=25° C. within 8 h. This procedure led to a filterable product. The particles were relatively fine and agglomerated; the solid had a filter resistance of $a\eta=1.5*10^{14}$ mPas/m$^2$. The mean particle size distribution of the dried end product is 41.5 μm. (volumetric mean diameter) and corresponded roughly to the prior art.

EXAMPLE 4

Preparation of Hydroxylamine-O-sulfonic Acid—Use of Methyl Benzoate as the Wash Solvent 872 g of 97% $H_2SO_4$ were initially charged and 266 g of solid hydroxylammonium sulfate were dissolved therein. The oleum metering to the resulting 23.4% hydroxylammonium sulfate/$H_2SO_4$ solution began at T=25° C. A total of 578 g of 65% oleum were metered in within 0.5 h, and the temperature was brought to T=110° C. by external heating at the end of the reaction. Subsequently, the reaction mixture was kept at this temperature for 6 h. The cooling to T=25° C. was effected within 8 h. After the crystals had been filtered off, the filtercake comprising sulfuric acid was washed with 300 g of 99% methyl benzoate. In contrast to the use of glacial acetic acid, only gentle heating by about 10° C. of the hydroxylamine-O-sulfonic acid crude product comprising sulfuric acid occurred.

The invention claimed is:

1. A process for preparing crystalline hydroxylamine-O-sulfonic acid, wherein
    a. hydroxylammonium sulfate is dissolved in sulfuric acid and oleum is metered in at a temperature in the range of from 105 to 115° C. within a period of from 0.2 to 4 hours to form a reaction mixture,
    b. the reaction mixture, after the oleum addition has ended, is stirred at a temperature in the range of from 105 to 115° C. for a further period in the range of from 6 to 10 hours,
    c. the reaction mixture is subsequently cooled to a temperature in the range of from 20 to 30° C. within a period of from 6 to 9 hours to form hydroxylamine-O-sulfonic acid crystals and
    d. the hydroxylamine-O-sulfonic acid crystals formed are filtered off and washed with methyl benzoate and then with ethyl acetate.

2. The process for preparing crystalline hydroxylamine-O-sulfonic acid according to claim 1, wherein oleum is metered in within a period of from 1 to 2 hours in process step a.

3. The process for preparing crystalline hydroxylamine-O-sulfonic acid according to claim 1, wherein the mean particle size of the hydroxylamine-O-sulfonic acid crystals is of from 50 to 110 μm.

* * * * *